US011062685B2

(12) United States Patent
Gomez

(10) Patent No.: US 11,062,685 B2
(45) Date of Patent: Jul. 13, 2021

(54) SYSTEM, APPARATUS, AND METHOD FOR REDUCING OR ELIMINATING THE ABILITY OF A SMART SPEAKER TO HEAR OR REACT TO AUDIBLE COMMUNICATIONS

(71) Applicant: Eduardo Gomez, Hialeah, FL (US)

(72) Inventor: Eduardo Gomez, Hialeah, FL (US)

(*) Notice: Subject to any disclaimer, the term of this patent is extended or adjusted under 35 U.S.C. 154(b) by 0 days.

(21) Appl. No.: 16/725,764

(22) Filed: Dec. 23, 2019

(65) Prior Publication Data

US 2020/0211522 A1 Jul. 2, 2020

Related U.S. Application Data

(60) Provisional application No. 62/886,715, filed on Aug. 14, 2019, provisional application No. 62/785,206, filed on Dec. 26, 2018.

(51) Int. Cl.
| | |
|---|---|
| *G10K 11/00* | (2006.01) |
| *G06F 3/16* | (2006.01) |
| *H04R 1/02* | (2006.01) |
| *H04R 3/00* | (2006.01) |
| *H04R 1/08* | (2006.01) |

(52) U.S. Cl.
CPC ............ *G10K 11/002* (2013.01); *G06F 3/167* (2013.01); *H04R 1/025* (2013.01); *H04R 1/08* (2013.01); *H04R 3/00* (2013.01); *H04R 2420/07* (2013.01); *H04R 2420/09* (2013.01)

(58) Field of Classification Search
CPC ....... G10K 11/002; G06F 3/167; H04R 1/025; H04R 1/08; H04R 3/00; H04R 2420/07; H04R 2420/09
See application file for complete search history.

(56) References Cited

U.S. PATENT DOCUMENTS

| | | | | |
|---|---|---|---|---|
| 3,963,883 | A * | 6/1976 | Kulka | H04M 1/19 379/453 |
| 2001/0018325 | A1* | 8/2001 | Adams | F24F 13/24 454/237 |
| 2008/0317265 | A1* | 12/2008 | Bouza, II | G10K 11/002 381/177 |

(Continued)

OTHER PUBLICATIONS

European Commission, "Harmonisation of a charging capability of common charger for mobile phones—frequently asked questions", Jun. 29, 2009, European Commission, pp. 1-2. (Year: 2009).*

(Continued)

*Primary Examiner* — Fan S Tsang
*Assistant Examiner* — Daniel R Sellers
(74) *Attorney, Agent, or Firm* — Mark T. Vogelbacker; Eckert Seamans Cherin & Mellott, LLC

(57) ABSTRACT

A device for reducing or eliminating an ability of a smart device to hear or react to audible communications can include a base and a cover movable with respect to the base between an open position and a closed position. In the closed position the cover and the base combine to form an enclosed cavity that is sized and shaped to receive a smart device therein and reduce or eliminate an ability of the smart device to hear or react to audible communications. The device can be manual, mechanical and/or automatic and can be responsive to physical input(s) and/or one or more verbal or audible commands.

8 Claims, 13 Drawing Sheets

(56) References Cited

U.S. PATENT DOCUMENTS

| | | | | |
|---|---|---|---|---|
| 2011/0014863 | A1* | 1/2011 | Foster | H04K 3/415 |
| | | | | 455/1 |
| 2012/0071215 | A1* | 3/2012 | Bourque | G06F 1/266 |
| | | | | 455/573 |
| 2014/0161273 | A1* | 6/2014 | Soufan | H04K 3/43 |
| | | | | 381/73.1 |
| 2016/0098983 | A1* | 4/2016 | Lehmann | G10K 11/16 |
| | | | | 455/575.1 |
| 2016/0234356 | A1* | 8/2016 | Thomas | H05K 9/0069 |
| 2018/0240450 | A1* | 8/2018 | Moran, Jr. | H02J 7/025 |
| 2018/0277086 | A1* | 9/2018 | Soffer | G10K 11/175 |
| 2019/0333493 | A1* | 10/2019 | Zenk | G10L 21/0208 |

OTHER PUBLICATIONS

Enterprise & Industry Magazine, "Tajani: Common charger for small electronic devices", Apr. 25, 2013, European Commission, Archive.org retrieved Aug. 5, 2013, (https://web.archive.org/web/20130805232010/http://ec.europa.eu/enterprise/magazine/articles/single-market-goods/article_11065_en.htm), pp. 1-2. (Year: 2013).*

Weise, Elizabeth, "6 ways to keep Alexa from eavesdropping on you", USA Today, Published Mar. 25, 2018, Updated May 29, 2018, <https://www.northjersey.com/story/tech/talkingtech/2018/05/25/6-ways-keep-alexa-eavesdropping-you/645504002/> (accessed via web on Dec. 19, 2019).

Schwartz, Eric Hal, "Smart Speaker Privacy in a Homemade Box", Voicebot.ai, Published Jun. 21, 2019, <https://voicebot.ai/2019/06/21/smart-speaker-privacy-in-a-homemade-box/> (accessed via web on Dec. 19, 2019).

* cited by examiner

SYSTEM, APPARATUS, AND METHOD FOR REDUCING OR ELIMINATING THE ABILITY OF A SMART SPEAKER TO HEAR OR REACT TO AUDIBLE COMMUNICATIONS

CROSS-REFERENCE TO RELATED APPLICATION

The present application claims priority to U.S. Provisional Application No. 62/886,715 filed Aug. 14, 2019 and U.S. Provisional Application No. 62/785,206 filed Dec. 26, 2018, the entire disclosure of each is hereby incorporated by reference in its entirety.

FIELD

In one embodiment, the presently disclosed technology relates to a device for reducing or eliminating the ability of one or more smart speakers to hear or react to audible communications.

BACKGROUND

Smart speakers, such as Amazon's Alexa, Google Home, Apple's Ski, Microsoft's Cortana and other digital assistants, are widely used today and seemingly gaining popularity. Consumers enjoy the convenience of being able to provide an audible command to the smart speaker, and the efficiency of allowing the smart speaker to complete a task the consumer would otherwise spend time completing.

Despite the numerous benefits of smart speakers, many consumers are concerned that their smart speaker may be used for nefarious purposes, such as to allow others to eavesdrop on conversations or monitor their actions inside the privacy of their home, for example. Numerous methods have been considered to prevent this from happening, such as those explained in the article titled "6 ways to keep Alexa from eavesdropping on you," USA TODAY, published 8:07 pm ET, May 25, 2018.

SUMMARY

Although certain known methods for preventing eavesdropping through a smart speaker are known, it would be desirable to create a system, apparatus and method for doing so that is reliable and/or easy to use, and/or allows the consumer or user to almost immediately switch between allowing the smart speaker to hear audible commands and prevent the smart speaker from hearing audible commands. Such a system, apparatus and method would give consumers confidence that no third party is monitoring private conversations. The presently disclosed technology meets the above objectives and provides other benefits.

In one embodiment, the presently disclosed technology is directed generally to a device for reducing or eliminating an ability of one or more smart speakers to hear or react to audible communications. The device can include a base and a cover being movable with respect to the base between an open position and a closed position. In the closed position, the cover and the base combine to form an enclosed cavity that is sized and shaped to receive a smart speaker therein and reduce or eliminate an ability of the smart speaker to hear or react to audible communications.

BRIEF DESCRIPTION OF THE SEVERAL VIEWS OF THE DRAWINGS

The foregoing summary, as well as the following detailed description of the presently disclosed technology, will be better understood when read in conjunction with the appended drawings. For the purpose of illustrating the presently disclosed technology, there are shown in the drawings various illustrative embodiments. It should be understood, however, that the presently disclosed technology is not limited to the precise arrangements and instrumentalities shown. In the drawings.

DETAILED DESCRIPTION

Figure 1:
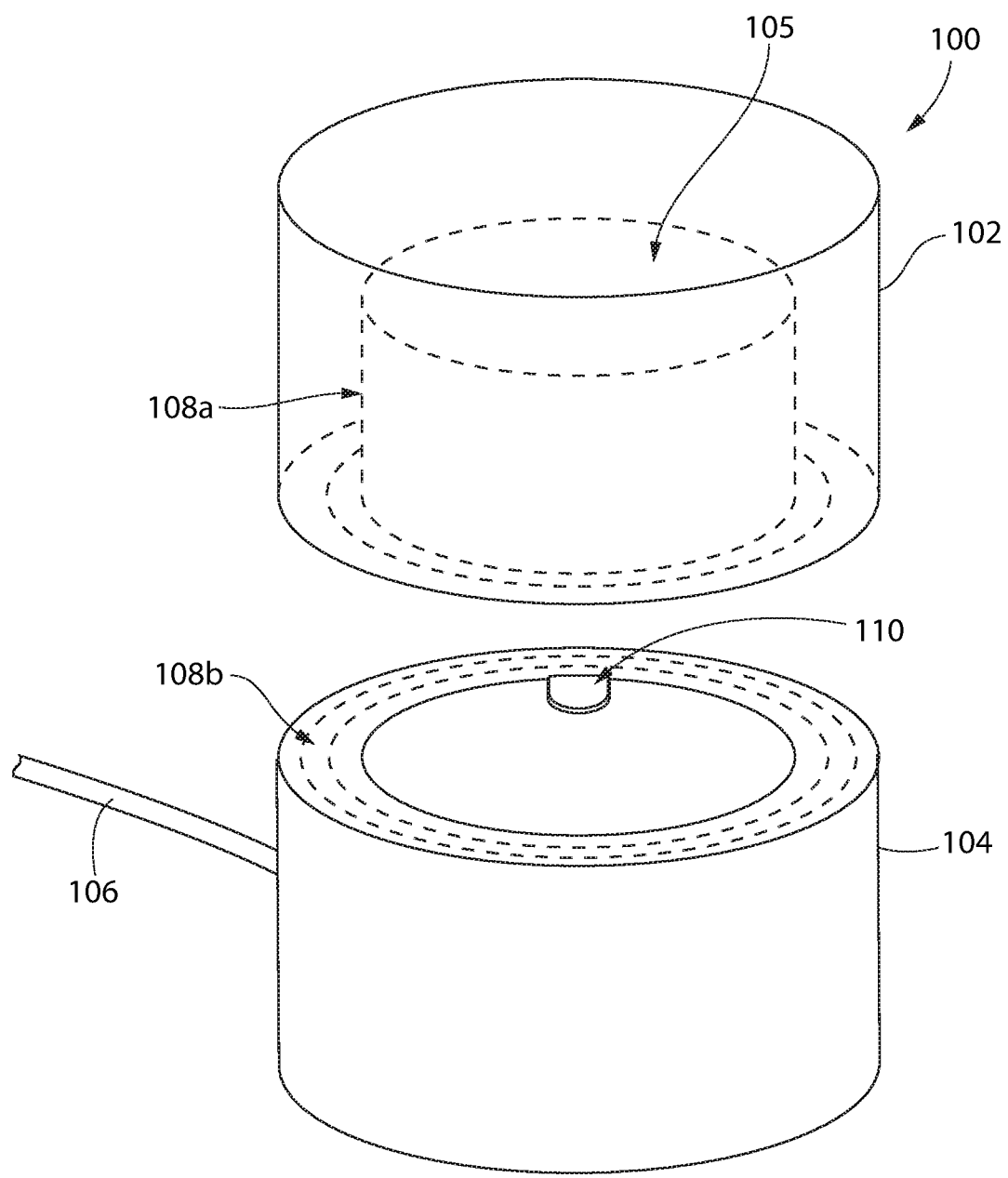
FIG. 1 is a partially exploded top perspective view of a device according to an embodiment of the presently disclosed technology, with at least certain portions shown in phantom for clarity.

While systems, devices and methods are described herein by way of examples and embodiments, those skilled in the art recognize that the systems, devices and methods of the presently disclosed technology are not limited to the embodiments or drawings described. Rather, the presently disclosed technology covers all modifications, equivalents and alternatives falling within the spirit and scope of the appended claims. Any headings used herein are for organizational purposes only and are not meant to limit the scope of the description or the claims.

Certain terminology is used in the following description for convenience only and is not limiting. The words "bottom," "top," "left," "right," "lower" and "upper" designate directions in the drawings to which reference is made. Unless specifically set forth herein, the terms "a," "an" and "the" are not limited to one element but instead should be read as meaning "at least one." As used herein, the word "may" is used in a permissive sense (i.e., meaning having the potential to) rather than the mandatory sense (i.e., meaning must). The terminology includes the words noted above, derivatives thereof and words of similar import.

The term "smart speaker" is broadly defined herein to cover any of a variety of wired or wireless devices that can be configured to be activated upon voice command (e.g., one or more speakers). In one embodiment of the presently disclosed technology, the "smart speaker" can include an integrated virtual assistant that offers interactive actions and hands-free activation. The "smart speaker" referred to herein can utilize Wi-Fi, Bluetooth and/or other wireless protocol standards to extend usage beyond audio playback, such as to control home automation devices. This can include, but is not limited to, features such as compatibility across a number of services and platforms, peer-to-peer connection through mesh networking, virtual assistants, and others. Smart speakers can also include a screen or display to show the user a visual response, and in one embodiment can be a cellular telephone (e.g., a smart phone), a smart thermostat, a smart camera, or the like, such that the "smart speaker" of the presently disclosed technology can broadly be a "smart device" or a "smart electronic device." Of course, smart speakers can come in various shapes and sizes.

Figure 2:
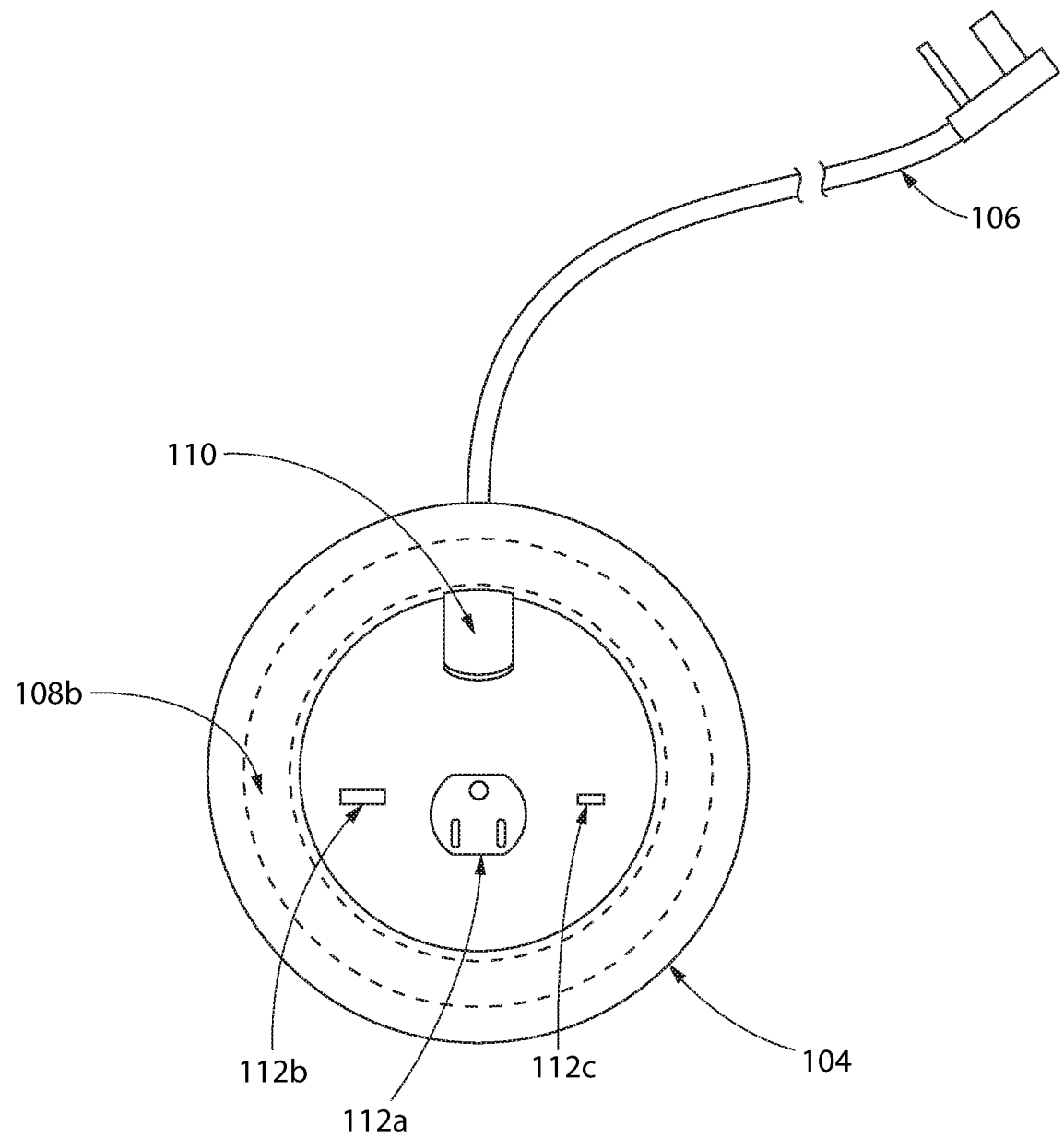
FIG. 2 is a top plan view thereof with at least certain portions shown in phantom for clarity.
Figure 3:
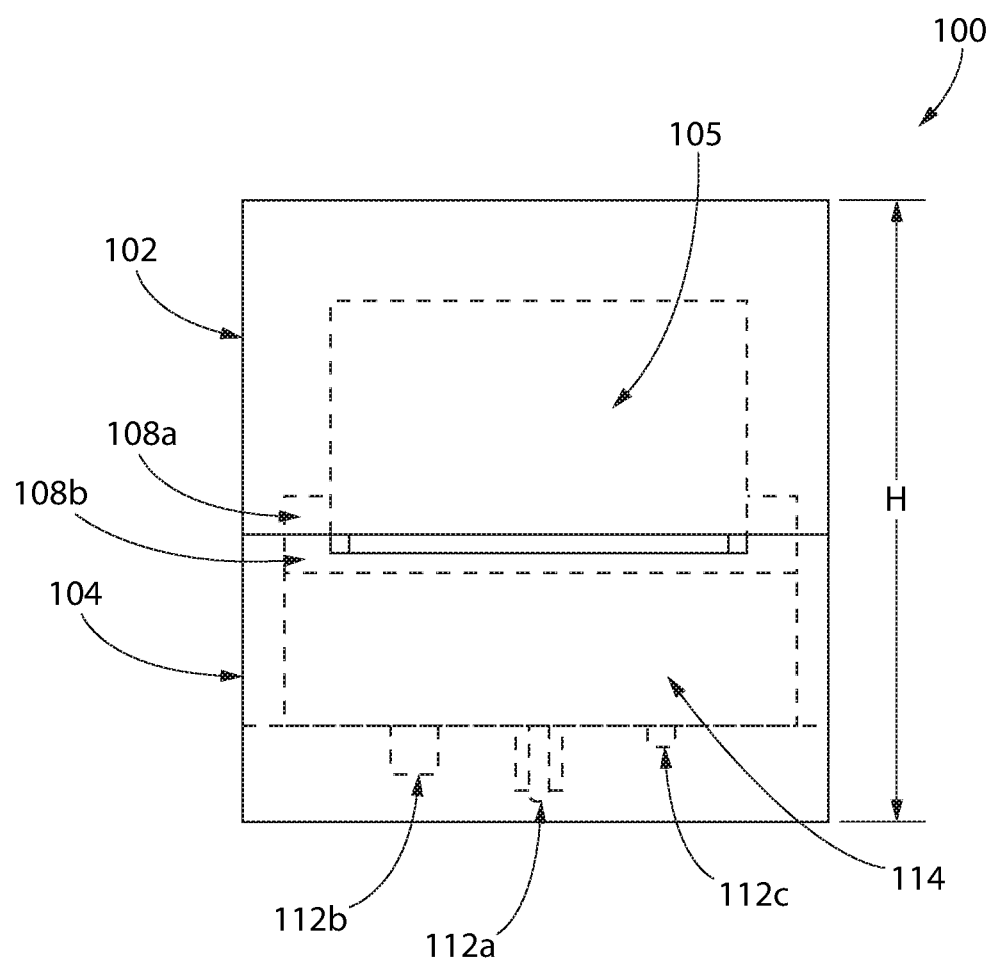
FIG. 3 is a side elevation view thereof with at least certain portions shown in phantom for clarity.
Figure 4:
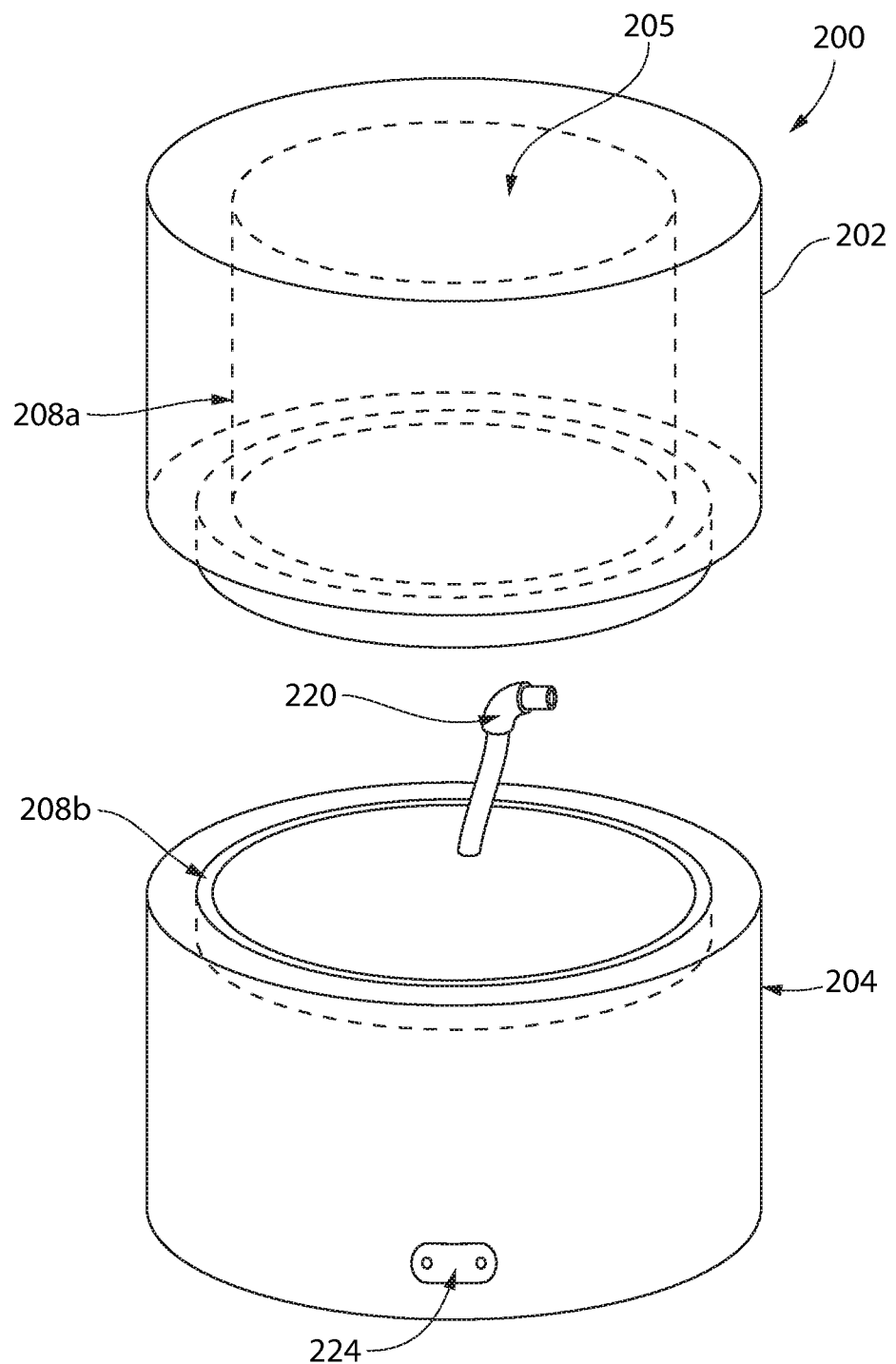
FIG. 4 is a partially exploded top perspective view of a device according to another embodiment of the presently disclosed technology, with at least certain portions shown in phantom for clarity.
Figure 5:
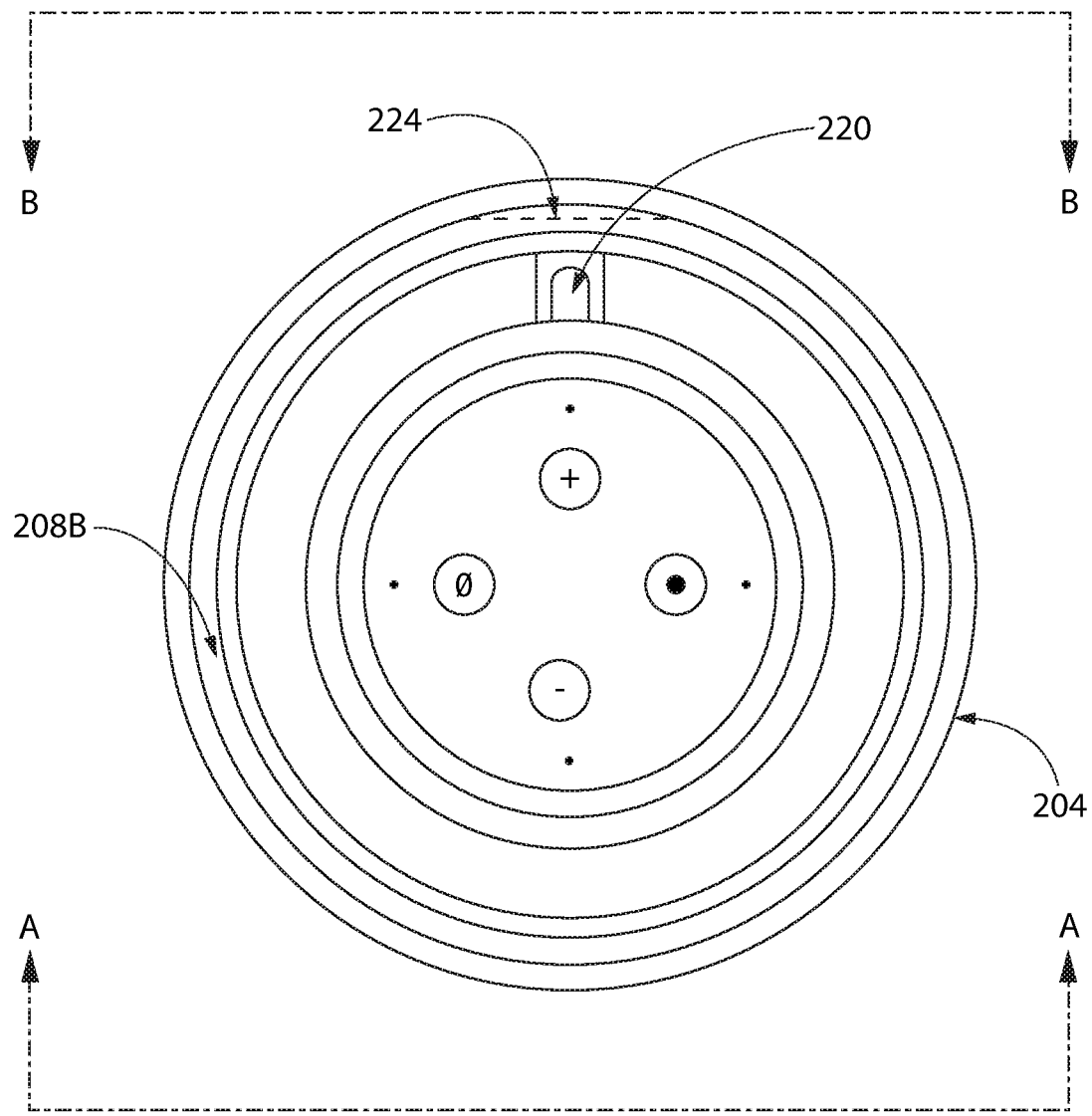
FIG. 5 is a top plan view of a base of the device shown in FIG. 4, with at least certain portions shown in phantom for clarity.
Figure 6:
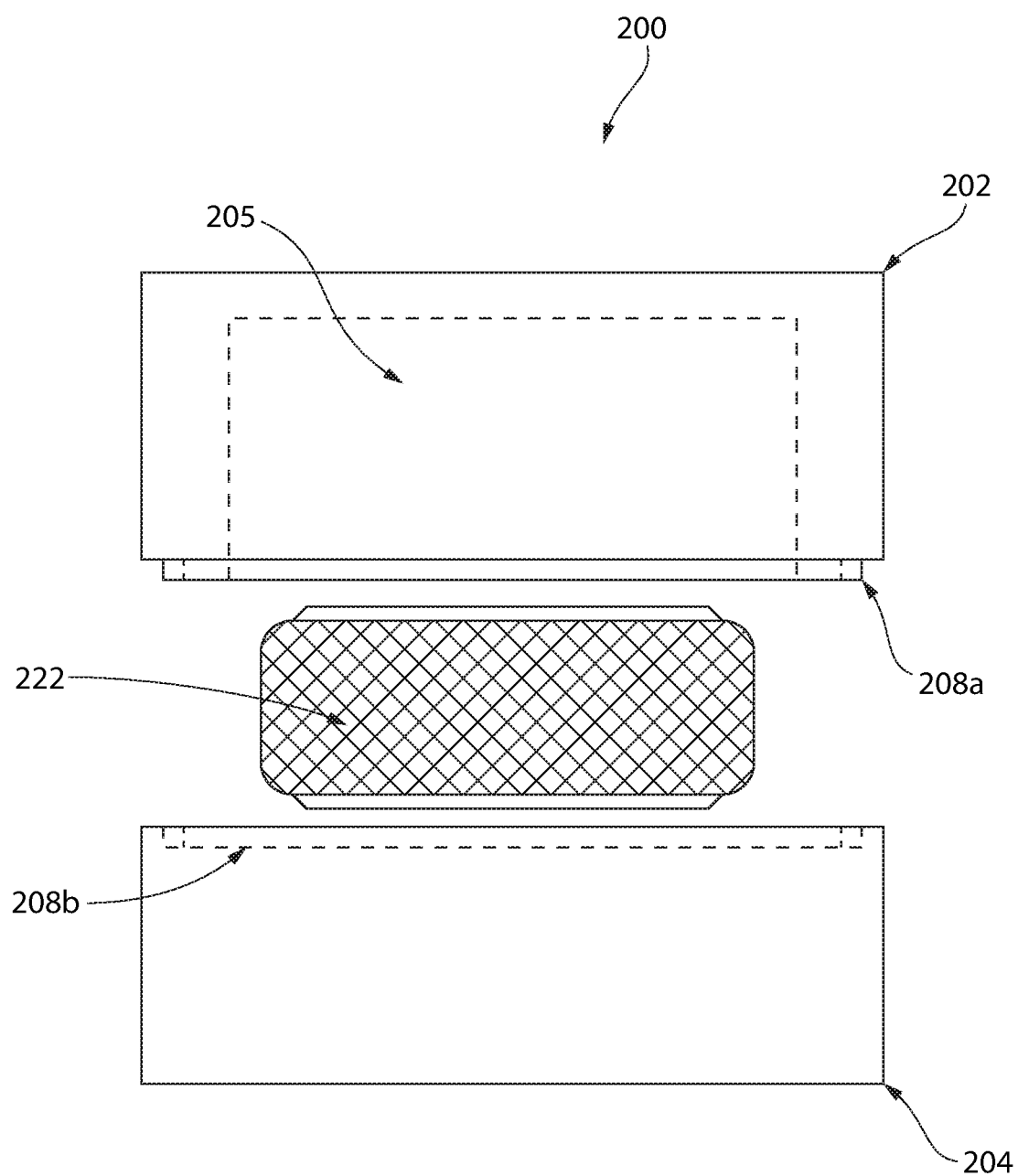
FIG. 6 is a partially exploded side elevation view of the device shown in FIG. 4 and taken from the perspective of line A-A in FIG. 5, with at least certain portions shown in phantom for clarity.
Figure 7:
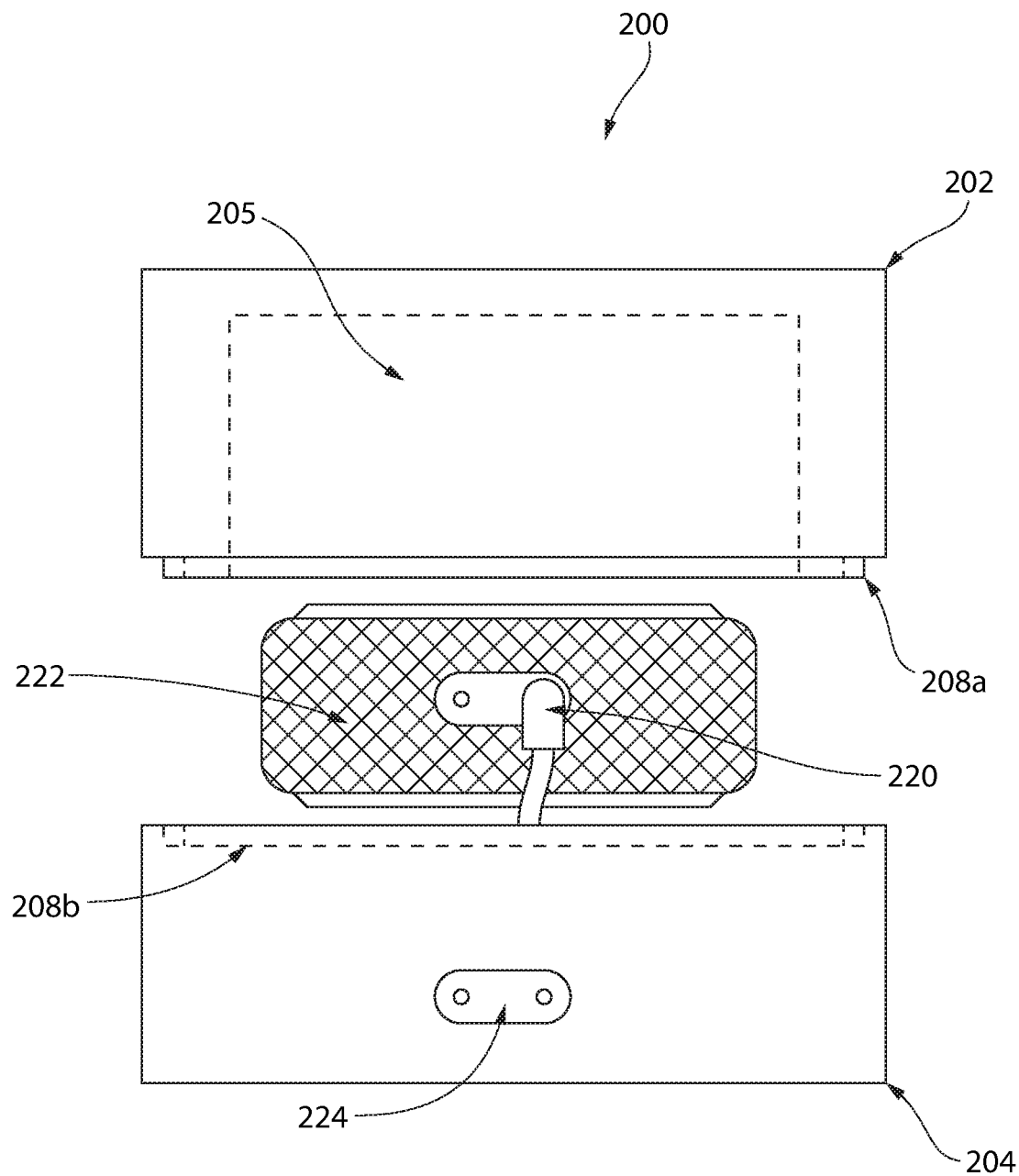
FIG. 7 is another partially exploded side elevation view of the device shown in FIG. 4 and taken from the perspective of line B-B in FIG. 5 with at least certain portions shown in phantom for clarity.
Figure 8:
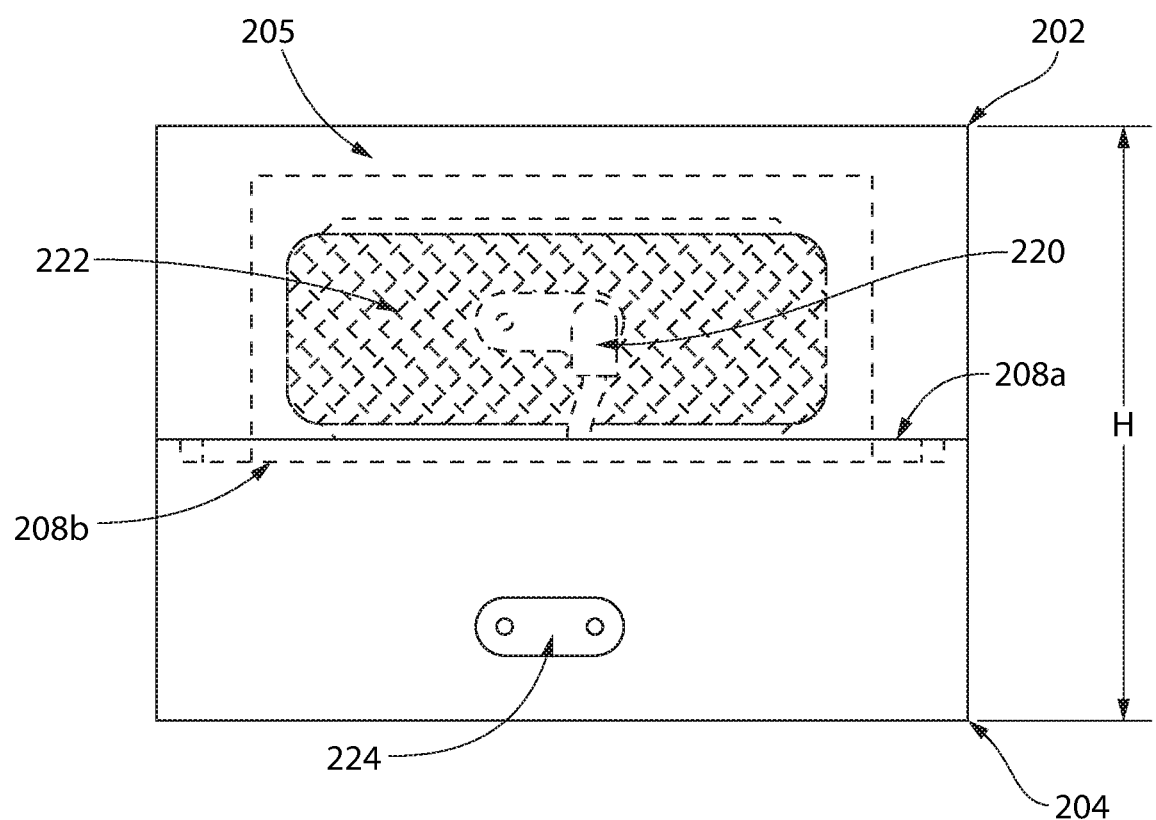
FIG. 8 is a side elevation view thereof of the device shown in FIG. 4 and taken from the perspective of line B-B in FIG. 5, with at least certain portions shown in phantom for clarity.

Referring to the drawings in detail, wherein like numerals indicate like elements throughout, FIGS. 1-3 show an optional embodiment of a device, generally designated 100, according to the presently disclosed technology. The device 100 can include a top cover 102 and a base 104. The cover 102 can be movable with respect to the base 104 between an open position and a closed position. In the closed position the cover 102 and the base 104 can combine to form an enclosed cavity that is sized and/or shaped to receive and/or surround a smart speaker or device (not shown) therein. As described in detail below, in the closed position, the device 100 can reduce or eliminate the ability of the smart speaker to hear or react to audible communications, even when the smart speaker is "on," has electrical power supplied to it, and/or is "listening" for audible cues.

The cavity or space defined by the combined cover 102 and base 104 can have any of a variety of sizes, shapes and/or configurations to accommodate smart speakers from different manufactures or vintages, for example. FIG. 1 shows a portion 105 of the cavity that is formed within the cover 102. The portion 105 of the cavity that is formed within the cover 102 can be larger (e.g., greater volume) than a portion of the cavity that is formed within the base 104. Optionally, as shown in FIG. 3, the base 104 can include a void 114. The overall height H (see FIG. 3) of the device 100 can depend upon the type, size and/or shape of smart speaker used. Similarly, the overall width or length of the device 100 can depend on the smart speaker used.

In the embodiment shown in FIGS. 1-3, the cover 102 is separable from the base 104. Alternatively, the device 100 can include a hinge (not shown) to allow the cover 102 to be pivotally attached to the base 104. The device 100 can be opened or closed manually or with some type of mechanical and/or electrical automation when instructed physically and/or verbally Each of the cover 102 and the base 104 can have a cylindrical shape. However, the device 100 is not so limited, as the cover 102 and the base 104 can have any of a variety of shapes (e.g., cubical or spherical) that allow the device 100 to accomplish the functionality described herein. For example, the size, shape and/or configuration of the cover 102 and/or the base 104 can depend on the smart speaker for which the device 100 is being used.

As shown in FIGS. 1 and 2, the base 104 can include an opening or passageway 110 to receive or guide at least a portion of a power cord or cable (not shown) of the smart speaker or an electrical adapter (not shown). The opening 110 can be located proximate an upper, open end of the base 104. The power supply for the device 100 can be separate from the smart speaker (e.g., through use of the power cord or cable), or the device 100 can use or connect to the power supply of the smart speaker.

The base 104 can optionally include a power cable 106. Optionally, the power cable 106 can be configured to extend outwardly from an exterior surface of the base 104 and engage a conventional electrical outlet (not shown) to supply power to the base 104. An interior of the base 104 can include on or a plurality of connectors. In one embodiment, the connectors can include a conventional three-prong electrical socket 112a, a USB port 112b and/or a mini USB port 112c. Additional or alternative types of connectors could be used.

Optionally, a hermetic seal can be created or formed between a connection point of the cover 102 and the base 104 around a perimeter of the device 100. "Hermetic seal" is broadly defined herein as any type of sealing that makes a given object airtight (e.g., excludes the passage of air, oxygen, or other gases). The term originally applied to airtight glass containers, but it can be applied to a larger category of materials, including rubber and plastics. In one embodiment, the hermetic seal can be formed when a portion 108a of the cover 102 contacts or is within a certain distance of a corresponding portion 108b of the base 104. Optionally, the hermetic seal can extend the full perimeter of the device 100.

Optionally, at least a portion of the cover 102 and/or the base 104 can be magnetized to help maintain the device 100 in the closed position, help seal the combined cover 102 and base 104, and/or encourage the cover 102 to attach to the base 104. In one embodiment, the magnetic portion extends around a lower periphery of the cover 102 and/or an upper periphery of the base 104. One or more magnets can be strategically located on and/or in the cover 102 and the base 104.

The cover 102 and the base 104 can be formed of any of a variety of materials that allow the device 100 to accomplish the functionality described herein. For example, the cover 102 and/or the base 104 can be formed of a metallic material, a metallic alloy, a rubber material or a polymeric material that prevent sound or radio waves from passing therethrough, or at least disrupt the flow of sound or radio waves passing therethrough such as that the smart speaker is unable to recognize and audible command or cue. Optionally, the entire or a portion of the cover 102 and the base 104 can be formed of fiberglass, neoprene rubber, viscoelastic foam and/or mass-loaded vinyl (MLV). The cover 102 and/or the base 104 can be formed of an opaque, translucent or transparent material.

In at least one embodiment, the base 104 or another portion of the device 100 is configured to illuminate. Optionally, the base 104 can selectively illuminate upon the occurrence of a particular event. For example, the base 104 can illuminate when the hermetic seal is formed with the cover 102, or broken or disrupted. Alternatively, the base 104 can illuminate upon power being supplied to the base 104.

Alternatively or additionally, the base 104 can illuminate when the base 104 supplies power to the smart speaker therein.

One method of using the device 100 includes inserting the plug 106 of the base 104 into an electrical outlet, inserting the plug of the smart speaker into an adapter or connector on an interior surface of the base to provide electrical power to the smart speaker, placing the smart speaker at least partially into the base, optionally turning the smart speaker "on" (if that is not automatically done by providing power to the smart speaker), and placing the cover 102 on top of the base 104 to surround the smart speaker within the cavity. When the user wishes to use the smart speaker, the user can simply remove the cover 102 from the base 104 (or pivot the cover 102 with respect to the base 104) and give an audible command to the smart speaker.

FIGS. 4-8 show another embodiment of the presently disclosed technology. Similar or identical structure between the embodiment of FIGS. 1-3 and the embodiment of FIGS. 4-8 is distinguished in FIGS. 4-8 by a reference number with a magnitude one hundred (100) greater than that of FIGS. 1-3. Description of certain similarities between the embodiment of FIGS. 1-3 and the embodiment of FIGS. 4-8 may be omitted herein for convenience and brevity only.

One distinguishing feature of the embodiment of FIGS. 4-8 is the inclusion of a plug 220. Optionally, the plug 220 can be part of the power cord of the smart speaker or smart device 222. Thus, the present embodiment can use the existing power cord of the smart speaker 222 to operatively and/or electrically connect the smart speaker 222 to the base 204 of the device 200. In one version, the base 204 can have a simple built-in wire that is configured to provide the low voltage required for the smart speaker 222 to operate. Such an embodiment would not necessarily require and therefore can omit the connectors 112a, 112b, 112c described in the embodiment of FIGS. 1-3.

In operation, the plug 220, which can be permanently and/or removably attached to the smart speaker 222, can be operatively and/or electrically connected to a power supply (such as a conventional wall mounted electrical socket) possibly through an adapter of the base 204. More particularly, the base 204 can include an adapter 224 at least on an exterior surface thereof. Optionally, the adapter 224 can extend through the side wall of the base 204. A power cord (not shown, but possibly similar to the power cord 106 of the embodiment of FIGS. 1-3) can extend from and connect a conventional wall mounted electrical socket, for example) and the adapter 224 of the base 204.

In an optional embodiment, the plug 220 is not part of the power cord of the smart speaker 222. Instead, the plug 220 can form part of an electrical connector of the base 204 that can be permanently or removably attached to an interior of the base 204 of the device 200. The plug 220 can be sized, shaped and/or configured to operatively and/or electrically connect to the smart speaker 222. The plug 220 can be movable with respect to the base 204 to accommodate smart speakers of different sized and/or shapes.

Figure 9:
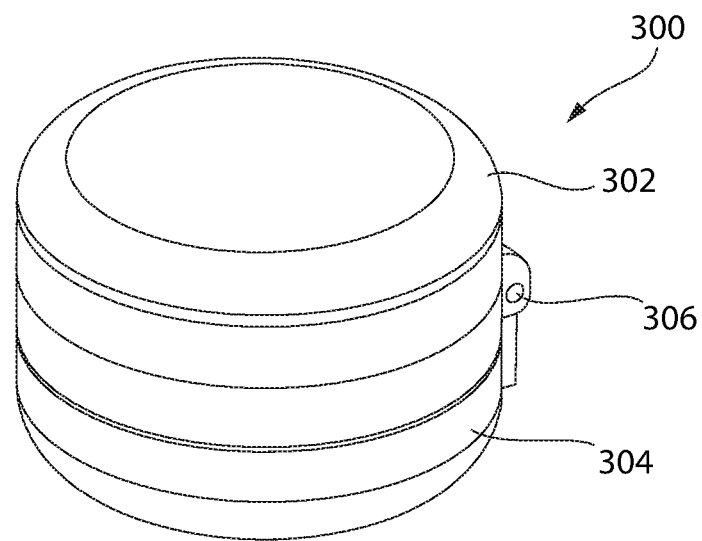
FIG. 9 is a top perspective view of a device according to another embodiment of the presently disclosed technology.
Figure 10:
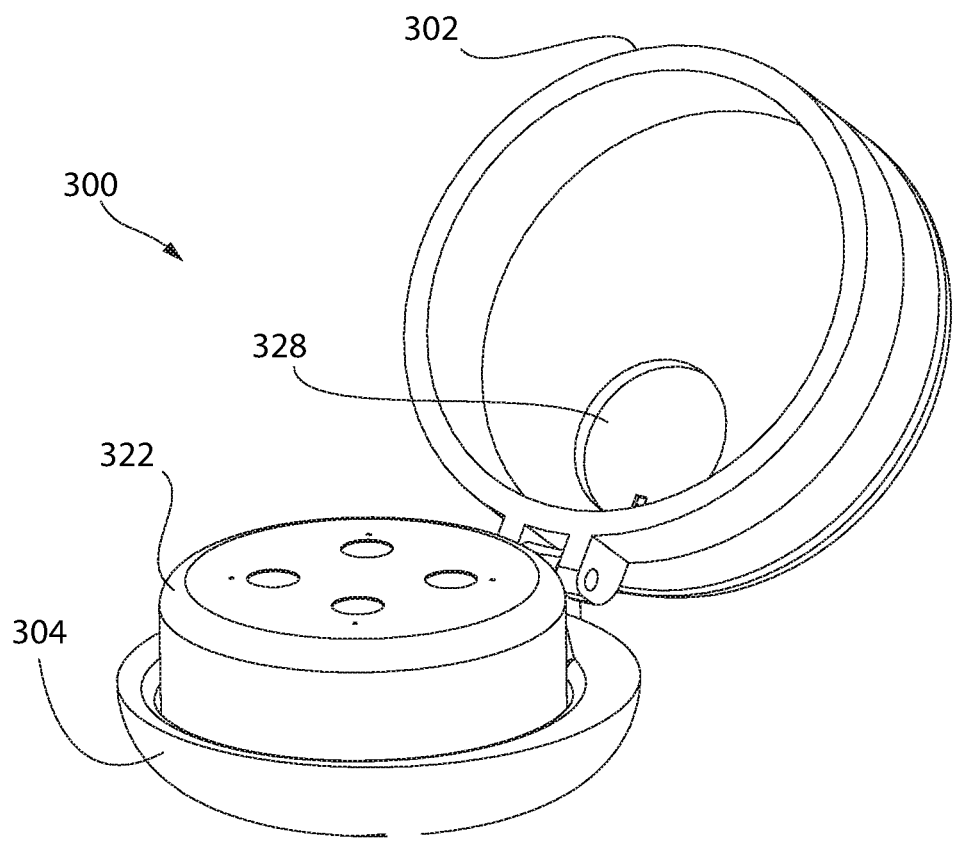
FIG. 10 is another top perspective view of the device shown in FIG. 9, wherein the device is shown in an open position.
Figure 11:
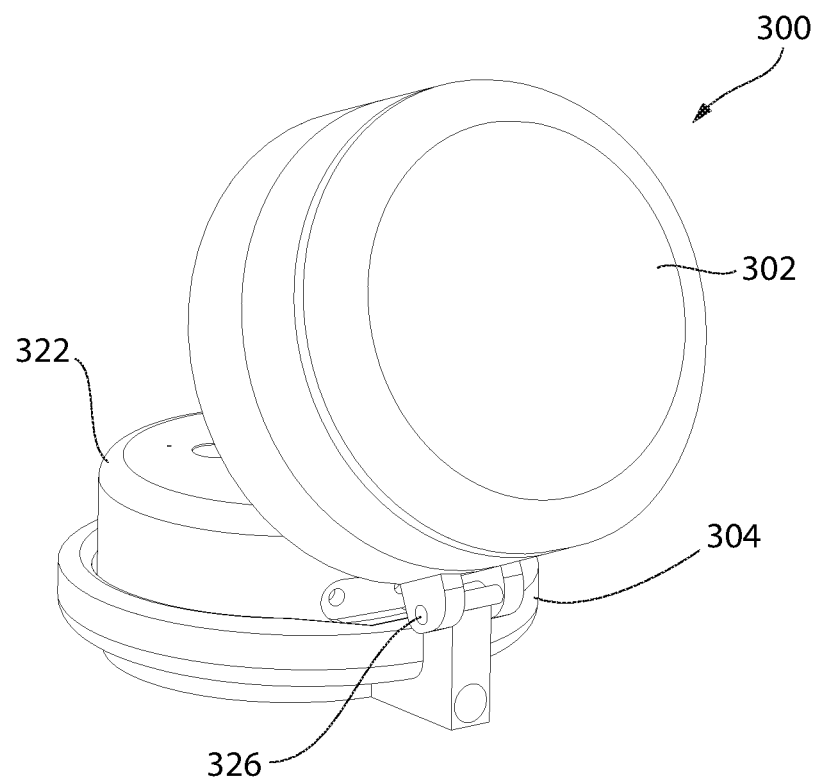
FIG. 11 is another top perspective view of the device shown in FIG. 10.

FIGS. 9-11 show another embodiment of the presently disclosed technology. Similar or identical structure between the embodiments of FIGS. 1-8 and the embodiment of FIGS. 9-11 is distinguished in FIGS. 9-11 by a reference number with a magnitude two hundred (200) greater than that of FIGS. 1-3. Description of certain similarities between the embodiments of FIGS. 1-8 and the embodiment of FIGS. 9-11 may be omitted herein for convenience and brevity only.

As shown in FIGS. 9 and 11, the device 300 of the present embodiment can include the cover 302 being pivotally attached to the base 304. For example, a pin 326 can extend through a slot in a portion of the cover 302 and the base 304 to create a hinge between the base 304 and the cover 302. The presently disclosed technology is not limited to a hinge as shown and described herein, as other forms of hinges (for example, but not limited to, a living hinge) can be employed.

As in the previous embodiments, the cover 302 and the base 304 can move between an open position (see FIGS. 10 and 11) and a closed position (see FIG. 9). In the open position, the smart speaker 322 is exposed and in the closed position the smart speaker 322 is enclosed and/or hermetically sealed within the device 300.

As shown in FIG. 10, the device 300 can include a sound or noise generator 328. The sound generator 328 can be located at least partially within the internal cavity of the device 300, such as attached to or extending inward from an interior surface of the cover 302. Optionally, the sound generator 328 can receive power from the smart speaker 322, one or more batteries, or a power cord plugged into an electrical outlet.

Optionally, the sound generator 328 can include one or more microphones and one or more speakers. The microphones and speakers can be connected to and/or controlled by one or more processors. In operation, the one or more microphones can listen constantly when the device 300 is turned "ON" or when power is supplied to the device 300. When the one or more microphones sense(s) sound(s) or a noise, the one or more processors can cause the one or more speakers to generate one or more sounds or noises inside the device 300. This operation would have the effect of garbling or jumbling any sound(s) or noise the smart speaker 322 is attempting to hear or sense. The sound(s) or noise generated by one or more individuals or other devices outside of the device 300 would be unrecognizable to the smart speaker 322, such that the smart speaker 322 would not understand the sound(s) or noise as words and, therefore, the smart speaker 322 could not accurately "listen".

Optionally, the sound generator 328 can comprise, consist or consist essentially of a music generator. The music generator can emit sound, noise and/or music upon one or more events, such as but not limited to when the device 300 is closed and/or when the device 300 is turned "ON" (e.g., a button on the exterior of the device 300 is activated and/or when the sound generator 328 senses an audible signal.

Optionally, the sound generator 328 can be activated by a user through a remote control.

The combination of the sound generator 328 and the (e.g., hermetic) seal formed between the closed cover 302 and the base 304 isolate the smart speaker 322 so that it cannot "listen" when a user prefers.

Figure 12:
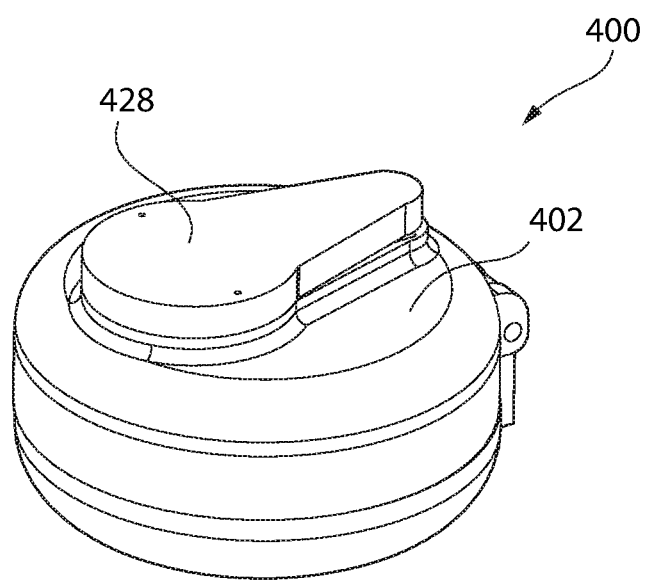
FIG. 12 is a top perspective view of a device according to another embodiment of the presently disclosed technology.
Figure 13:
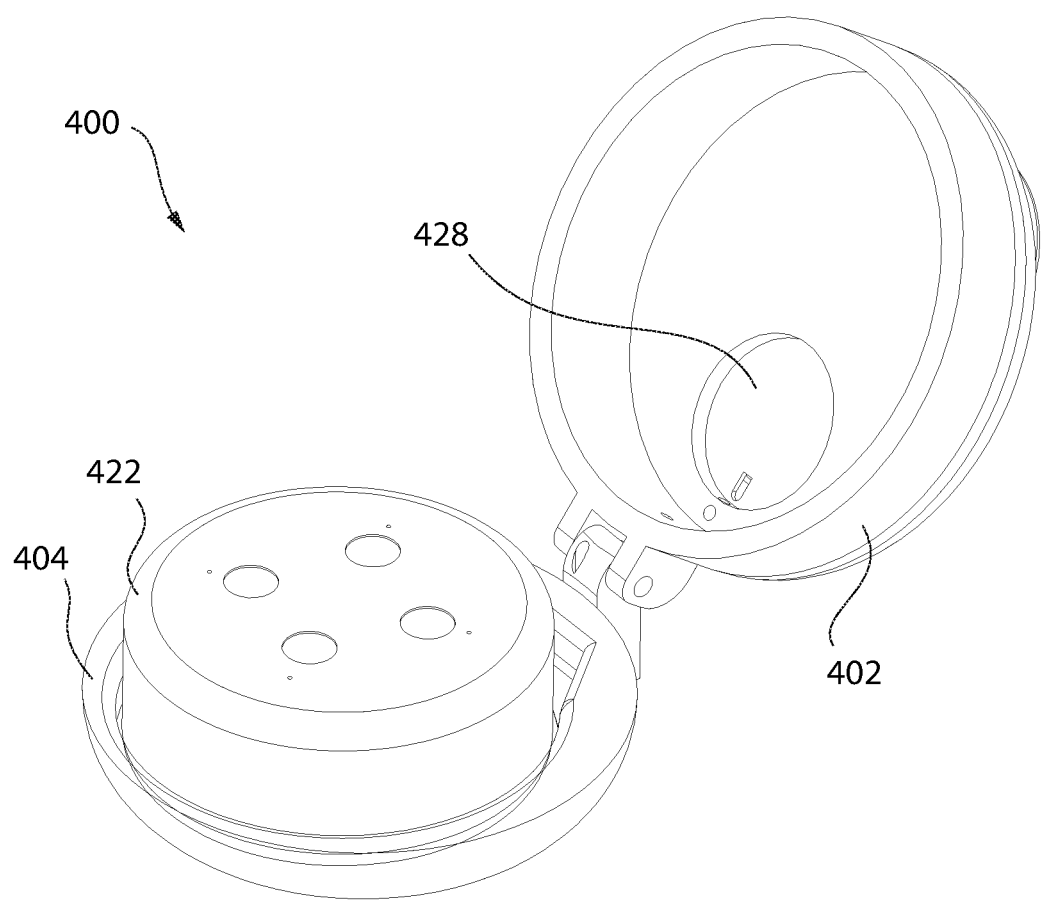
FIG. 13 is another top perspective view of the device shown in FIG. 12, wherein the device is shown in an open position.
Figure 14:
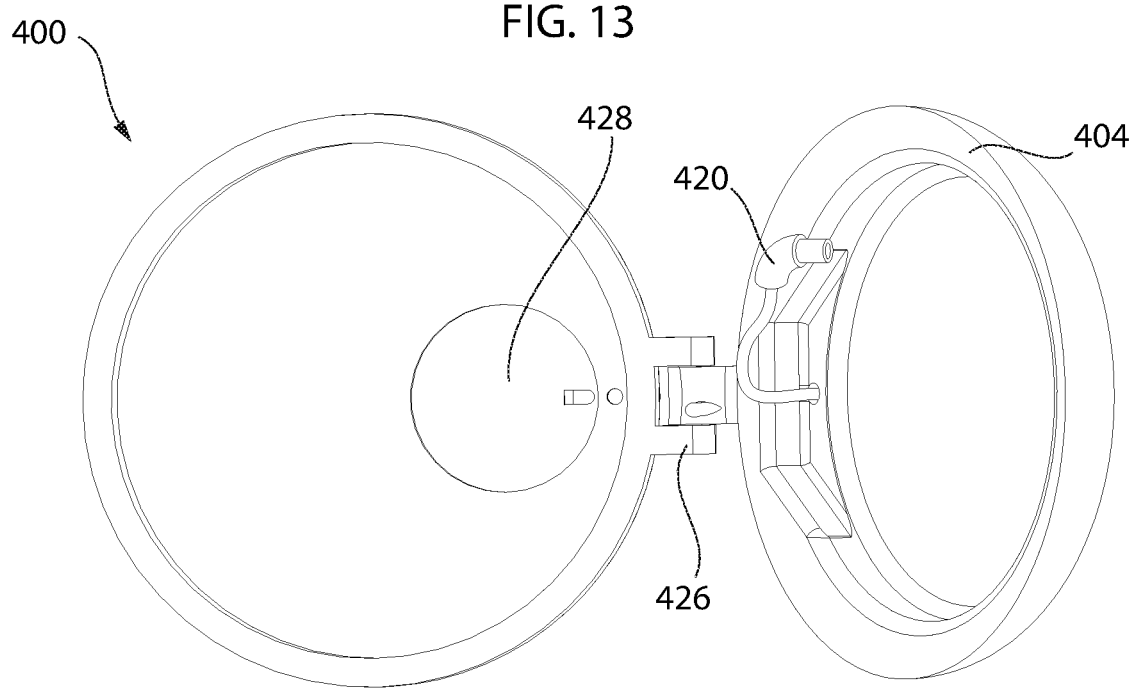
FIG. 14 is a top plan view of the device shown in FIG. 13.

FIGS. 12-14 show another embodiment of the presently disclosed technology. Similar or identical structure between the embodiments of FIGS. 1-11 and the embodiment of FIGS. 12-14 is distinguished in FIGS. 12-14 by a reference number with a magnitude three hundred (300) greater than that of FIGS. 1-3. Description of certain similarities between the embodiments of FIGS. 1-11 and the embodiment of FIGS. 12-14 may be omitted herein for convenience and brevity only.

The device 400 of the present embodiment can include the base 402, the cover 404, the hinge 426, and the sound generator 428. The hinge 426 can be pivotally attached to the cover 404 to the base 402. As shown in FIG. 12, at least a portion of the sound generator 428 extends outwardly and/or above the exterior surface of the cover 404. At least a portion of the microphone(s) and/or the speaker(s) are visible and/or are exposed on the interior surface of the cover 404 (see FIGS. 13 and 14). The plug 420 can electrically connect the device 400 to the smart speaker 422.

Figure 15:
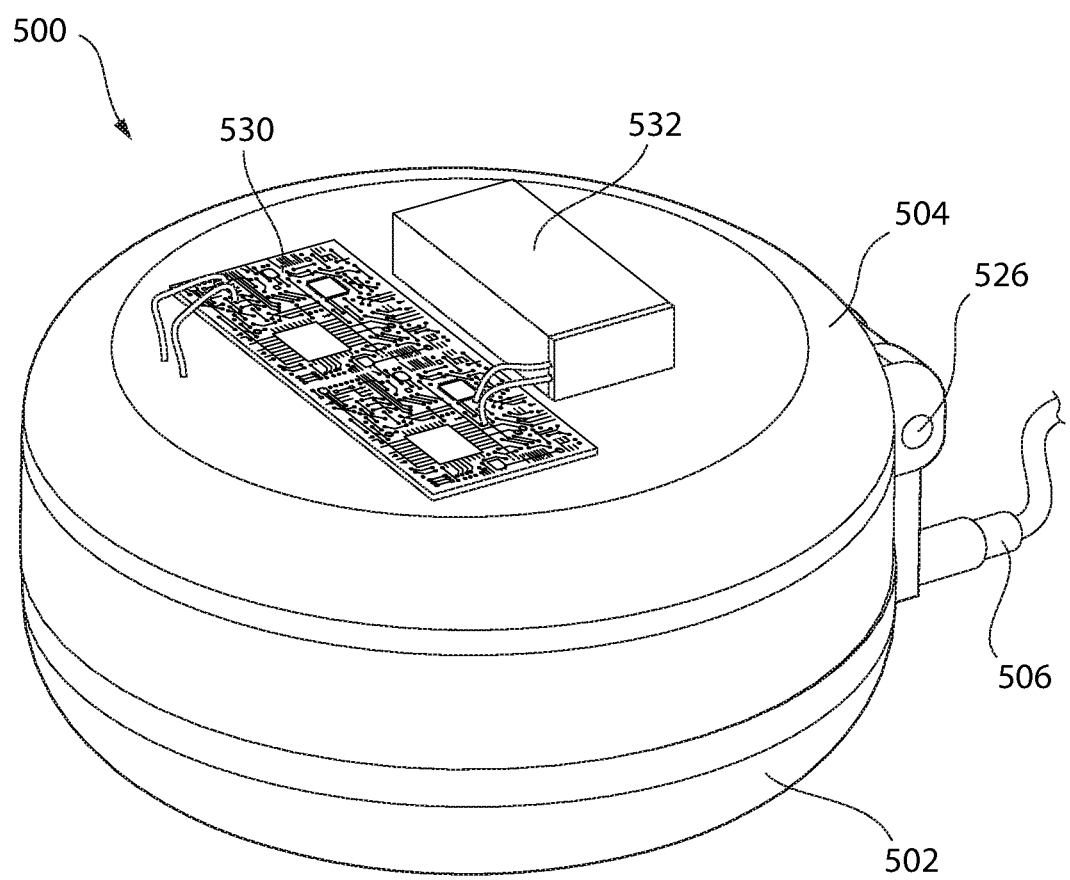
FIG. 15 is a top perspective view of a device according to another embodiment of the presently disclosed technology.

FIG. 15 shows another embodiment of the presently disclosed technology. Similar or identical structure between the embodiments of FIGS. 1-14 and the embodiment of FIG. 15 is distinguished in FIG. 15 by a reference number with a magnitude four hundred (400) greater than that of FIGS. 1-3. Description of certain similarities between the embodiments of FIGS. 1-14 and the embodiment of FIG. 15 may be omitted herein for convenience and brevity only.

The sound generator 528 of the present embodiment can include a printed circuit board 530 and a power source 532. The power source 532 can be a battery (e.g., a 9V battery), but the power source 532 is not so limited and can be one or more of any of a variety of power sources (e.g., power can come from the smart speaker (not shown) when the smart speaker is electrically attached or connected to the device 500). Optionally, the printed circuit board 530 and the power source 532 can be located on and/or attached to an exterior surface of the cover 502. However, the printed circuit board 530 and the power source 532 can be positioned in other locations.

The power cable 506 can be configured to extend outwardly from an exterior surface of the base 504 and engage a conventional electrical outlet (not shown) to supply power to the base 504. The cover 502 can be pivotally attached to the base 504 by the hinge 526.

Figure 16:
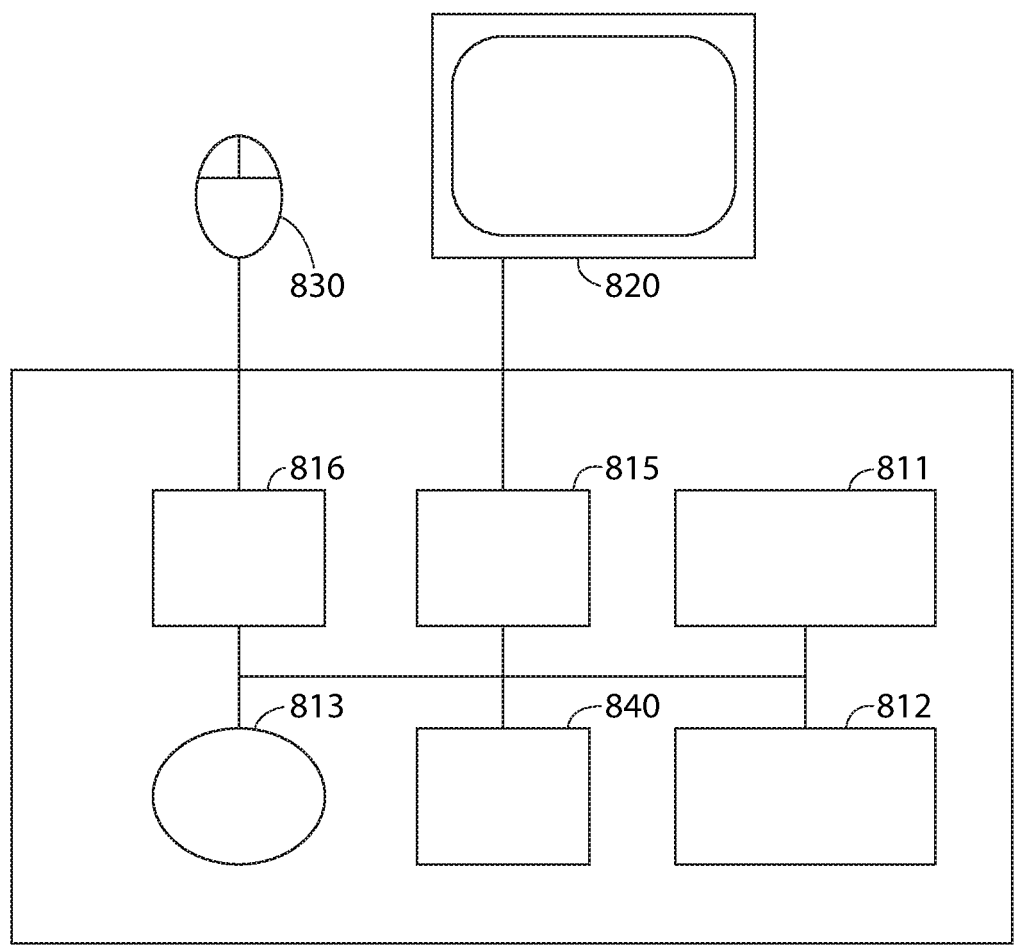
FIG. 16 is a schematic diagram of a computing system of one embodiment of the present disclosure.

One or more of the above-described techniques and/or embodiments can be implemented with or involve software, for example modules executed on one or more computing devices 810 (see FIG. 16). Of course, modules described herein illustrate various functionalities and do not limit the structure or functionality of any embodiments. Rather, the functionality of various modules may be divided differently and performed by more or fewer modules according to various design considerations.

Each computing device 810 may include one or more processing devices 811 designed to process instructions, for example computer readable instructions (i.e., code), stored in a non-transient manner on one or more storage devices 813. By processing instructions, the processing device(s) 811 may perform one or more of the steps and/or functions disclosed herein. Each processing device may be real or virtual. In a multi-processing system, multiple processing units may execute computer-executable instructions to increase processing power.

The storage device(s) 813 may be any type of non-transitory storage device (e.g., an optical storage device, a magnetic storage device, a solid state storage device, etc.). The storage device(s) 813 may be removable or non-removable, and may include magnetic disks, magneto-optical disks, magnetic tapes or cassettes, CD-ROMs, CD-RWs, DVDs, BDs, SSDs, or any other medium which can be used to store information. Alternatively, instructions may be stored in one or more remote storage devices, for example storage devices accessed over a network or the internet.

Each computing device 810 additionally may have memory 812, one or more input controllers 816, one or more output controllers 815, and/or one or more communication connections 840. The memory 812 may be volatile memory (e.g., registers, cache, RAM, etc.), non-volatile memory (e.g., ROM, EEPROM, flash memory, etc.), or some combination thereof. In at least one embodiment, the memory 812 may store software implementing described techniques.

An interconnection mechanism 814, such as a bus, controller or network, may operatively couple components of the computing device 810, including the processor(s) 811, the memory 812, the storage device(s) 813, the input controller(s) 816, the output controller(s) 815, the communication connection(s) 840, and any other devices (e.g., network controllers, sound controllers, etc.). The output controller(s) 815 may be operatively coupled (e.g., via a wired or wireless connection) to one or more output devices 820 (e.g., a speaker, a device capable of generating or producing noise or sound, etc.) in such a fashion that the output controller(s) 815 can transform the action(s) of the output device 820 (e.g., in response to modules executed). The input controller(s) 816 may be operatively coupled (e.g., via a wired or wireless connection) to one or more input devices 830 (e.g., a microphone, a voice input device, etc.) in such a fashion that input can be received from a user.

The communication connection(s) 840 may enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

FIG. 16 illustrates the computing device 810, the output device 820, and the input device 830 as separate devices for ease of identification only. However, the computing device 810, the output device(s) 820, and/or the input device(s) 830 may be separate devices, may be integrated in a single device, or any combination of devices. The computing device 810 may be one or more servers, for example a farm of networked servers, a clustered server environment, or a cloud service running on remote computing devices.

In one embodiment, the presently disclosed technology is directed to a non-transitory computer-readable medium having computer-readable code stored thereon that, when executed by one or more computing devices, causes the one or more computed devices to perform the one or more methods disclosed or claimed herein.

Although multiple embodiments are shown and described herein, it is understood that any one or more features of any particular embodiment can be omitted or included in another embodiment. For example, the device 10 can be operated, opened and/or closed via remote control, or that feature can be omitted.

It will be appreciated by those skilled in the art that changes could be made to the embodiments described above without departing from the broad inventive concept thereof. It is understood, therefore, that the presently disclosed technology is not limited to the particular embodiments disclosed, but it is intended to cover modifications within the spirit and scope of the presently disclosed technology as defined by the appended claims.

I claim:

1. A method of preventing a smart speaker from hearing audible communications by placing the smart speaker within a closed device, the closed device including a base and a cover, the method comprising:

inserting a first end of a power cord of the smart speaker into an adapter on an exterior surface of the base of the closed device, wherein the closed device does not include a power cord or power supply that is separate and distinct from the power cord of the smart speaker such that the closed device is configured to receive power through the power cord of the smart speaker, wherein the first end of the power cord of the smart speaker is in the form of a male barrel plug;

inserting a second end of the power cord of the smart speaker into a power source thereby providing power to the base of the closed device, wherein the second end of the power cord of the smart speaker is in the form of a two prong plug or three prong plug;

placing the smart speaker at least partially into the base and connecting the smart speaker to a connector on an interior surface of the base thereby providing power to the smart speaker through the base, wherein the connector on the interior surface of the base is electrically connected to the adapter on the exterior surface of the base, wherein the connector on the interior surface of the base is an electrical cord, the electrical cord including a male barrel plug at a first, free end thereof, the electrical cord is attached to the base at a second end thereof, the male barrel plug of the electrical cord is configured to be moved with respect to the base to accommodate movement of the smart speaker within the closed device without interrupting power to the smart speaker;

placing the cover of the device on top of the base to surround the smart speaker within a cavity formed by the combined cover and base and to create a hermetic seal therebetween to prevent the smart speaker from hearing audible communications generated outside of the cavity, wherein the base and the cover are formed of a material through which sound waves are absorbed or cannot pass, removing the cover from the base or pivoting the cover with respect to the base to place the device in an open position and expose the smart speaker therein, and providing an audible instruction to the smart speaker when the cover is in the open position.

2. The method of claim 1, wherein the entire base illuminates when (i) power is supplied to the device and (ii) the hermetic seal is formed between the base and the cover in a closed position.

3. The method of claim 1, wherein prior to placing the cover on top of the base, the method further comprises moving a power switch or button on the device from an OFF position to an ON position.

4. The method of claim 1, wherein the power source is an electrical socket.

5. A device for eliminating an ability of a smart speaker to hear or react to audible communications, the device comprising:

a base supporting or receiving a smart speaker, the smart speaker including a power cord configured to directly connect the smart speaker to a power source to provide power to the smart speaker, the base including at least one connector on an interior thereof and an adapter on an exterior surface thereof, the at least one connector and the adapter being electrically connected, the at least one connector on the interior of the base being an electrical cord having a male barrel plug at a first, free end thereof, the electrical cord being attached to the base at a second end thereof, the male barrel plug of the electrical cord being configured to be moved with respect to the base to accommodate movement of the smart speaker within the closed device without interrupting power to the smart speaker, a first end of the power cord of the smart speaker being configured to directly connect to the adapter of the base and a second end of the power cord of the smart speaker being configured to directly connect to the power source such that the power cord of the smart speaker is configured to provide power to the base, the smart speaker being configured to connect to the at least one connector on the interior of the base so that power is supplied to the smart speaker via the base through the power cord of the smart speaker; and a cover being movable with respect to the base between an open position and a closed position, in the closed position the cover and the base combining to form an enclosed cavity that is sized and shaped to receive the smart speaker therein and eliminate an ability of the smart speaker to hear or react to audible communications, wherein one of the base and the cover include a sound generator, the sound generator including at least one microphone, at least one speaker, and at least one processor operatively connected to each microphone and speaker, the at least one speaker of the base being positioned to direct sound into enclosed cavity, wherein the base and cover are formed of a material through which sound waves are absorbed or cannot pass, wherein the combined base and cover form a hermetic seal when in the closed position, and wherein the device does not include a power cord or power supply that is separate and distinct from the power cord of the smart speaker such that the device is configured to receive power through the power cord of the smart speaker.

6. The device of claim 5, wherein at least one of the base and the cover is configured to illuminate when the cover is in the closed position and power is supplied to the device.

7. The device of claim 5, wherein the entire base is configured to illuminate when the hermetic seal is formed.

8. The device of claim 5, wherein the power source is an electrical socket.

* * * * *